US011671407B2

(12) United States Patent
Sibillo

(10) Patent No.: US 11,671,407 B2
(45) Date of Patent: Jun. 6, 2023

(54) LASER LIGHT COMMUNICATIONS DEVICE FOR SECURELY TRANSMITTING DATA

(71) Applicant: Agostino Sibillo, Perris, CA (US)

(72) Inventor: Agostino Sibillo, Perris, CA (US)

(*) Notice: Subject to any disclaimer, the term of this patent is extended or adjusted under 35 U.S.C. 154(b) by 367 days.

(21) Appl. No.: 16/829,916

(22) Filed: Mar. 25, 2020

(65) Prior Publication Data

US 2020/0314069 A1 Oct. 1, 2020

Related U.S. Application Data

(60) Provisional application No. 62/823,577, filed on Mar. 25, 2019.

(51) Int. Cl.
*H04L 9/40* (2022.01)
*H04B 10/69* (2013.01)
*H04B 10/50* (2013.01)

(52) U.S. Cl.
CPC ....... *H04L 63/0428* (2013.01); *H04B 10/503* (2013.01); *H04B 10/69* (2013.01)

(58) Field of Classification Search
CPC ...... H04B 10/11; H04B 10/85; H04B 10/807; H04B 10/69; H04B 10/503; H04L 63/0428
USPC .......................................................... 726/26
See application file for complete search history.

(56) References Cited

U.S. PATENT DOCUMENTS

| | | | | |
|---|---|---|---|---|
| 7,064,823 B2* | 6/2006 | Roche | ................... | H04L 25/063 356/246 |
| 7,079,722 B2* | 7/2006 | Mahbobi | ............... | H04B 10/807 385/24 |
| 7,805,756 B2* | 9/2010 | Ellis | ........................ | H04L 43/00 713/192 |
| 8,713,708 B1* | 4/2014 | Goldberg | ................ | G06F 21/10 726/28 |
| 8,819,837 B2* | 8/2014 | Lacey | ................ | G06K 19/0776 705/2 |
| 9,465,960 B2* | 10/2016 | Tucker | ..................... | G06F 21/73 |
| 9,941,965 B2* | 4/2018 | Lucrecio | ................ | H04B 10/27 |
| 10,277,321 B1* | 4/2019 | Carlson | ................. | H04B 10/69 |
| 11,356,183 B2* | 6/2022 | Golan | .................... | H01S 5/0071 |
| 2005/0182927 A1* | 8/2005 | Shatford | ............... | G07F 7/1008 713/159 |
| 2007/0016957 A1* | 1/2007 | Seaward | ................. | G06F 21/32 726/26 |

(Continued)

*Primary Examiner* — Amare F Tabor
(74) *Attorney, Agent, or Firm* — Anooj Patel; Kevin Schraven; Hankin Patent Law APC

(57) ABSTRACT

An apparatus and a method are provided for an optical wireless communication (OWC) laser light communications device. The laser light communications device comprises one or more pairs of transmitting and receiving cells. The transmitting and receiving cells may be used in a variety of arrangements and configurations, and scaled appropriately for given data transmission needs. A laser light signal, comprising a communication layer and a high-energy protection layer, is sent from transmitting cells to receiving cells. The high-energy protection layer physically envelopers the communication layer. The protection layer provides for enhanced security and encryption, and ensures signal integrity when received and ultimately decoded and interpreted. The receiving cells may be configured to utilize the energy of the high-energy protection layer, such as by using the energy to charge a battery, or to provide energy for a subsequent transmission.

14 Claims, 5 Drawing Sheets

(56) References Cited

U.S. PATENT DOCUMENTS

2017/0085319 A1* 3/2017 Latham .................. H04L 12/40
2017/0093501 A1* 3/2017 Meitl .................... H01L 31/105

* cited by examiner

Regular Transmission (No physical encryption of data)

Encrypted Transmission (Data cells are physically encrypted)

LASER LIGHT COMMUNICATIONS DEVICE FOR SECURELY TRANSMITTING DATA

CROSS-REFERENCE TO RELATED APPLICATIONS

This Patent Application is a U.S. Non-Provisional Patent Application that claims the benefit of and priority to U.S. Provisional Patent Application No. 62/823,577, filed on Mar. 25, 2019, titled "LASER LIGHT COMMUNICATIONS DEVICE FOR SECURELY TRANSMITTING DATA", by inventor Agostino Sibillo, the contents of which are expressly incorporated herein by this reference as though set forth in their entirety and to which priority is claimed.

FIELD OF USE

Embodiments of the present disclosure generally relate to the field of optical wireless communications. More specifically, embodiments of the disclosure relate to the encrypted sharing of data via lasers shared between a transmitter and receiver.

BACKGROUND

Optical wireless communications (OWC) generally allow the sharing of information over physical distances, provided there is a clear line of sight and no significant signal blockage or interference. In its simplest form, OWC may take the form of, for instance, using mirrors and light reflected from the sun to transmit information over relatively large distances, or simply using fire as a light source to indicate a predetermined message. OWC has evolved from its historical origins of using mirrors and reflect sunlight to, more recently, making use of LEDs and laser light to create a signal that is capable of transmitting large amounts of data in a short amount of time in a digital format.

While laser light OWC has provided significant improvements in transmission speed compared to other means of data transmission, there are still issues related to signal integrity (accuracy and completeness of transmission) and security (encryption of signal).

Accordingly, what is needed is an OWC capable of transmitting large quantities of information while being secure and encrypted.

SUMMARY OF EMBODIMENTS

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure may be directed to a laser light communications device for delivering information via controlled emission and absorption of high-energy light pulses. The laser light communications device may comprise: a laser light transmitter, a laser light receiver, photo diodes, comparative amperage chips, comparative voltage chips; and a laser light signal comprising a communication layer and a protection layer.

One embodiment of a laser light communication apparatus may be a laser light communication apparatus, comprising: a light transmitter; a light receiver; and a control module; wherein the light transmitter may comprise one or more light transmitting cells; wherein the light receiver may comprise one or more light receiving cells; and wherein the light transmitting cells generates a data light, wherein the data light may be based on a data packet to be transmitted. The light transmitter may comprise a barrier light source; wherein the barrier light source may substantially surround the one or more light transmitting cells such that a light generated by the barrier light source encapsulates the data light. The barrier light source may comprise a plurality of light emitting sources. The light receiver may comprise a barrier light receiver. The barrier light receiver may be in electronic communication with the control module and may be configured to generate a stop signal if the barrier light receiver does not receive the light generated by the barrier light source; and wherein the stop signal may cause the light transmitter to pause generating the data light. The barrier light receiver may be configured to generate a go signal if the barrier light receiver receives the light generated by the barrier light source after generating the stop signal; and wherein the control module may be configured to determine a portion of the data packet to be transferred that was interrupted between the stop and go signals and resend the portion of the data packet to be transferred and thereafter continue transmitting remainder of the data packet to be transferred. The light receiver may comprise a power source that may be charged when the barrier light receiver receives the light generated by the barrier light source. Alternatively, the light receiver may comprise a power source that may be charged when the light receiver receives the data light. The laser light communication apparatus may further comprise a stabilizer; wherein the stabilizer ensures that the light transmitter and the light receiver are aligned such that the data light may be received by the light receiving cells.

One embodiment of a method of transmitting information using a laser light communication apparatus, may comprise the step of transmitting a data from a data transmitter to a data receiver; wherein the data transmitter may be a light transmitter comprising one or more light transmitting cells; wherein the data receiver may be a light receiver comprising one or more light receiving cells; and wherein the data may be encoded by a control module to be translated into a series of light pulses. The data may be transmitted through the series of light pulses, which are generated by the light transmitting cells and received by the light receiving cells. The method of transmitting information may further comprise the step of physically encrypting the data by having the control module allocate portions of the data to specific individual units of the light transmitting cells via an encryption key, such that after the data may be received by the light receiver, the data must be decrypted according to the encryption key in order to be intelligible.

The encryption key may be predetermined or generated and transmitted to the light receiver before any of the data may be transmitted from the light transmitter to the light receiver.

In one embodiment of the present disclosure, a laser light communications device is presented. The communications device may comprise a transmitter, a receiver, and convex and polarized lenses. The signal is carried by laser pulses transmitted between the transmitter and receiver, along with an additional outer protection layer of high-energy light that physically surrounds the information layer of light. Additionally, the high-energy protection layer may be absorbed by the receiver, such that the same energy that is used to send the first data may be stored and used to either send subsequent data signals, or to recharge the recipient (or other) device.

In one embodiment, a laser light communications method may be provided, comprising: generating a signal for transmission; transmitting the signal (comprising a communication layer and a protection layer); and, receiving and interpreting the signal via a receiver. The signal for transmission may be based on software code provided by a separate or integrated electronic computing device.

In one embodiment, the lenses may be used as an optical stabilizer that may prevent misalignment and/or adjust cell alignment to ensure that the laser light signal is transmitted to, and received by, the correct receiving cell. The lens stabilization may be managed by appropriate software.

In one embodiment, a secondary transmission may be generated with the energy used in an initial transmission. This is done by utilizing and absorbing some energy from the high-energy communication layer (green laser) with the receiver. In this manner, the receiving cells may accumulate power which is received from the high-energy communication layer. This accumulated power serves to power a new transmission cycle, sending information and requests to the PIER, which may be another way of calling the sender.

It is an object to provide a laser light communications device and method which is capable of securely transmitting data with encryption and a protection layer.

It is an object to provide a laser light communications device which is capable of accumulating and repurposing the energy of an initial transmission signal, for example by storing the energy to recharge a battery, or to provide energy for receiving the transmission or generating and sending a subsequent transmission.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as to not unnecessarily obscure aspects of the embodiments.

While multiple embodiments are disclosed, still others will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

As used herein, the term "coupled" is defined as meaning connected either directly to the component or indirectly to the component through another component.

As used herein, the terms "about," "approximately," or "substantially" for any numerical values or ranges indicate a suitable dimensional tolerance that allows the part or collection of components to function for its intended purpose as described herein.

As used herein, the terms "approximately" and "about" generally refer to a deviance of within 15% of the indicated number or range of numbers. In one embodiment, the term "approximately" and "about", refer to a deviance of between 0.0001-40% from the indicated number or range of numbers.

Traditional OWC laser light devices have difficulties with data encryption and maintaining a secure signal throughout the transmission process. While the OWC process has some inherent safety built-in by virtue of the need for physical signal interception, this alone is not a desirable or sufficient safeguard. Embodiments presented herein provide for a laser light communications device which makes use of a two-tiered transmission signal, comprising a communication (or information) layer and a protection (signal integrity) layer, to provide for maximum signal security, even in the event of physical signal interception.

Furthermore, the embodiments presented herein provide for a laser light communications device which is uniquely able to make use of the energy inherent in all laser light, and especially the high-energy protection layer, as discussed in the present disclosure. The receiving cells are configured to not only receive and interpret the transmitted signal, but are able to retain and utilize (at least a portion of) the energy from the protection layer, enabling such uses as charging a battery, or powering a subsequent signal transmission.

Figure 1:
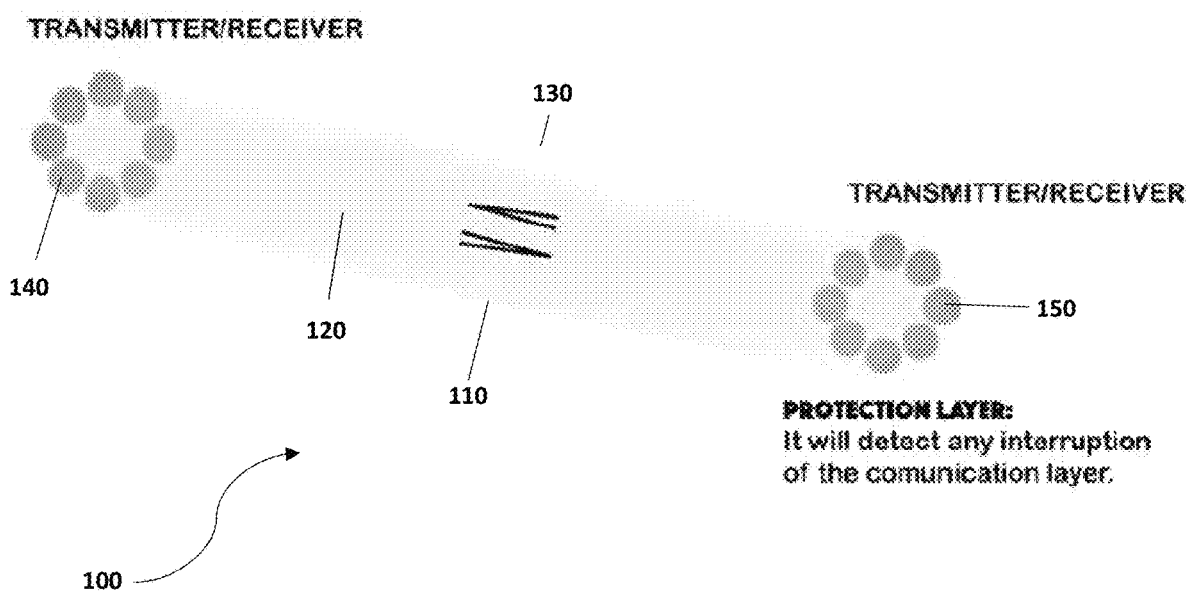
FIG. 1 illustrates an exemplary embodiment of a laser light communications device that is configured to make use of a protection layer to ensure signal integrity and data encryption during data transmission.

FIG. 1 illustrates an exemplary embodiment of a laser light communications device 100 that is configured to make use of a protection layer 110 to ensure signal integrity and data encryption during data transmission. The protection layer 110 accompanies the communication layer 120 during the transmission process, with the protection layer 110 and the communication layer 120 together forming the final laser light signal 130 that is transmitted. Transmitting cells 140 project the laser light signal 130 to corresponding receiving cells 150, whereupon the laser light signal 130 is interpreted and decoded by the receiving cells 150. In one embodiment, the transmitting cells 140 and/or receiving cells 150 may be replaced with transceiving cells capable of transmitting and receiving signals.

As mentioned, the laser light signal 130 uses a two-tiered approach to information transmission, containing a protection layer 110 and a communication layer 120.

The first tier of the laser light signal 130 comprises a communication layer 120, which contains the code or information portion of the transmission—the digital signal that contains the desired content (such as text, audio files, images, and the like). The communication layer 120 is generated from controlling software which converts the information-to-be-shared into a specific laser-pulse format. Laser pulses (in accordance with the desired signal) are in turn generated from a laser unit. Appropriate controlling software may coordinate both the information conversion into laser-pulse format, and the corresponding laser pulses emitted by the laser unit. Said laser pulses, as part of the communication layer 120, are received and interpreted after transmission by the receiving cells 150, resulting in coherent transmission of the desired information from transmitter to receiver.

The second tier of the laser light signal 130 comprises a protection layer 110, which may improve the security and reliability of signal transmission between the transmitting and receiving cells. The protection layer 110 is transmitted concurrently with the above-mentioned communication layer 120 and is generated in much the same way as the communication layer 120. However, the protection layer 110, rather than varying its signal intensity during transmission to reflect the underlying data being transmitted, may emit continuously during the transmission process. The protection layer 110 may serve as an "ON/OFF" switch for the receiving cells 150, by indicating whether a signal is currently being transmitted, or not. Additionally, if the entirety of the protection layer 110 is not received by the receiving cells 150, then that information may be used to indicate at least some portion of the laser light signal 130 is being blocked, not reaching the receiving cells, or even being intercepted, allowing additional security or replaying measures to take place, depending on the situation.

In one embodiment, if the receiving cells 150 receive laser light pulses comprising the communication layer 120 without accompanying pulses from the protection layer 110, the controlling software may immediately cease the transmission process. In this manner, the protection layer 110 safeguards the communication layer 120 from physical interception. This is especially true because the protection layer 110 is sent by transmitting cells 140 which form a physical perimeter around the transmitting cells 140 of the communication layer 120. The protection layer 110 thus forms an "envelope" around the information contained within the communication layer 120. OWC signals require physical interception of the light beams in order to be misappropriated by an outside party. By placing the protection layer 110 all around the light beams carrying the communication layer 120, it is not possible for outside parties to intercept the communication layer 120 without first intercepting the protection layer 110, which acts as a "tripwire" alarm of sorts which may immediately stops transmission of the laser light signal 130.

In another embodiment, perhaps where security is a less pressing concern (such as in closed and controlled environments such as office spaces), the protection layer 110 may alternatively be used to emphasize signal integrity during transmission. In this case, any interruption of the protection layer 110 during transmission (as noted by the continuously-monitoring receiving cells 150, which constantly check for receipt of the protection layer 110 during transmission) is logged by the receiving cells 150. After the transmission has ended, a log based on timestamps of not received protection layer 110 may be checked, and the receiving cells 150 may then request that the laser light signal 130 pulses corresponding to the missing timestamps be re-transmitted. The previously not received signal pulses (which may have been missed due to, for instance, temporary blockage of the signal by dust, fog, or other physical impediment) may then be cross-referenced with the previously-received information, and reassembled into the complete series of data as originally intended for transmission.

Figure 2:
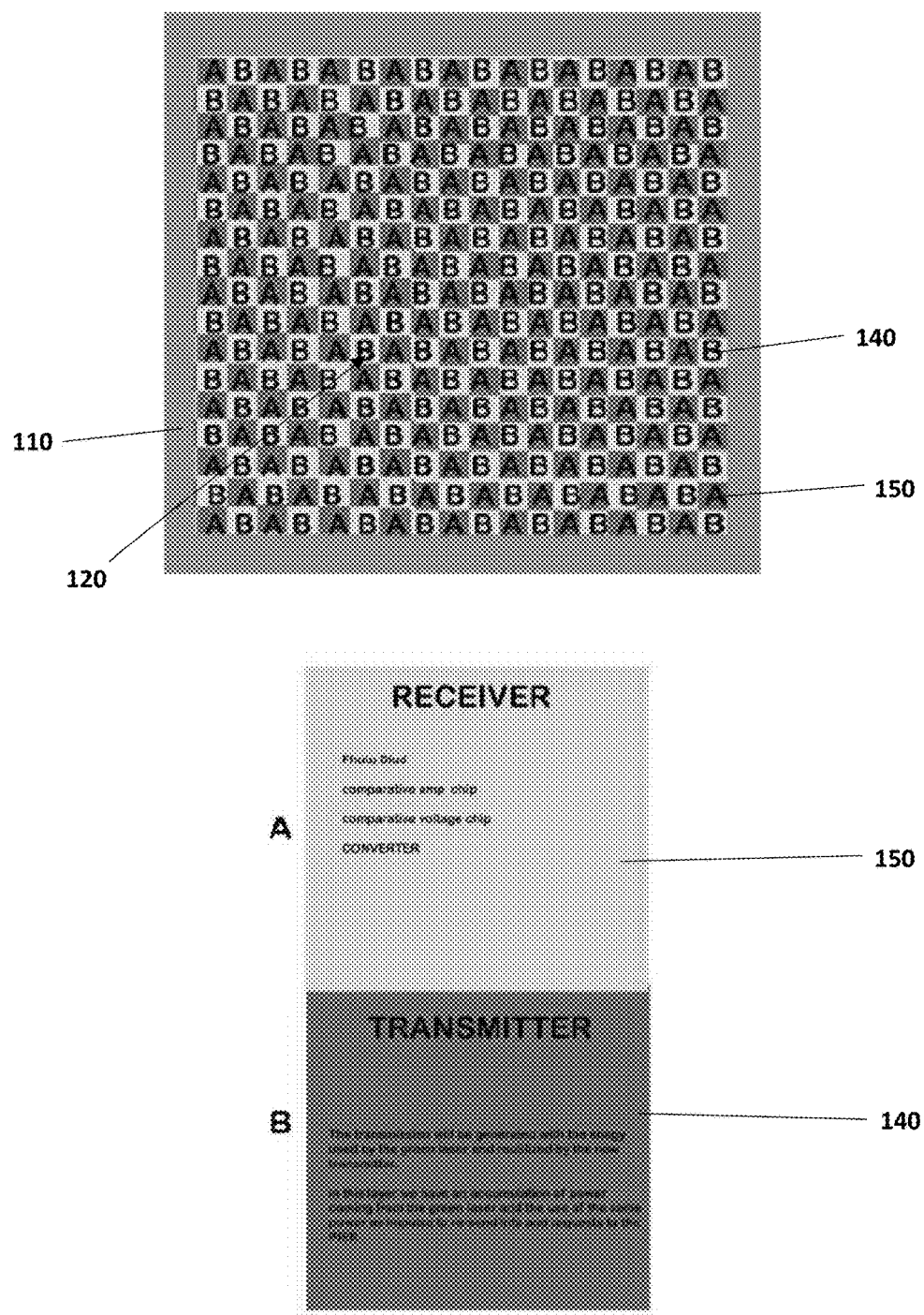
FIG. 2 illustrates a detailed view of the components for a laser light communications device, in accordance with the present disclosure.

FIG. 2 provides a detailed illustration of the transmission cells 140 and receiving cells 150 arranged in an array, bordered by the protection layer 110. All transmission is controlled via software. Furthermore, transmission cells 140 may be converted into receiving cells 150 and vice versa.

The entire transmission and receiving process may have several channels which are independent and may also be assigned to different users.

In one embodiment, the protection layer 110 makes use of a laser light frequency that is notably at a higher energy than the informational communication layer 120. The receiving cells 150 may be configured to make use of the high amount of energy in the protection layer 110, by using the energy inherent in the protection layer 110 to enable data receipt by the receiving cells 150 at no use of energy by the receiving cells 150. In one embodiment, the frequency may be 9,600 Hz, which may be high enough such that the laser light pulses are not visible to standard human vision.

In another embodiment, the high energy inherent in the protection layer 110 may be collected at the receiving end. In one embodiment, this may allow batteries to be recharged, such as in mobile phones and the like.

In another embodiment, the transmitting cells 140 and receiving cells 150 may be part of an optical stabilizer that may prevent and correct vibrations, and to help maintain alignment between cells. This stabilization may be controlled by an actuator/engine/motor, which may be controlled by software that may adjust the lenses to keep them on target. If the receiver and transmitter are not exactly aligned, the transmission may be stopped.

Figure 3:
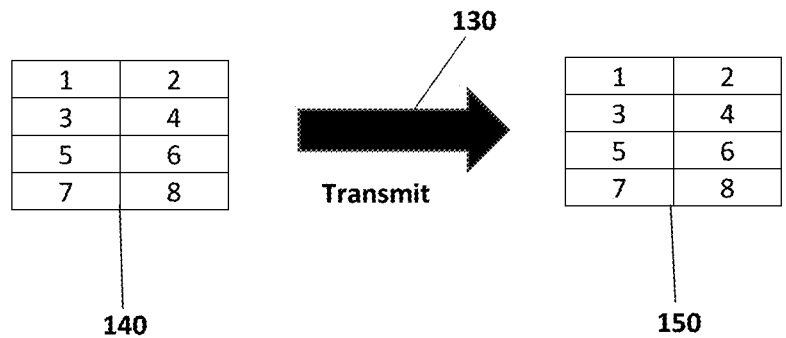
FIG. 3 illustrates an exemplary embodiment of an encryption method for securing the transmitted signal by physically distributing the signal in a predetermined pattern amongst a large number of transmitting and receiving cells.
Figure 3:
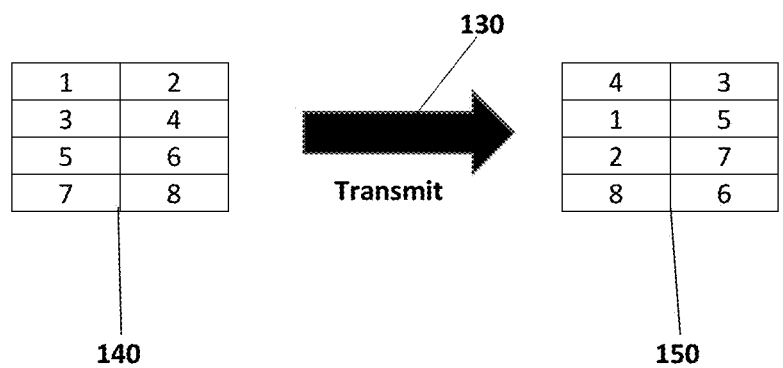

FIG. 3 is an illustration of another embodiment, which provides an additional means of encrypting the laser light signal 130 against interception and decoding. Ordinarily, the information (i.e., packet of data) sent from a given transmitter cell 140 will travel in a straight line, directly across to a precisely-aligned, corresponding receiving cell 150. This arrangement makes use of a straightforward transmission of the signal between a single pair of transceiving cells. This is shown in the unencrypted embodiment depicted in the top half of FIG. 3. In this embodiment, Transmitting Cell 1 conveys data packet 1 to Receiving Cell 1, Transmitting Cell 2 conveys data packet 2 to Receiving Cell 2 and so on.

There is no signal scrambling or encryption contemplated in this scenario. The data packets may then be reassembled to create the transmitted code.

However, in some embodiments, the laser light signal 130 may be physically encrypted, by having the managing software randomly reallocate portions of the signal (i.e., packets of data) between the transceiving cells, in accordance with a generated encryption key. Having thus physically scrambled the data signal, the laser light signal 130 is unintelligible upon receipt by the receiving cells 150 without the encryption key. Unless the data is reorganized in accordance with the initial distribution of the signal that was split amongst the transmitting cells 140, the intercepted signal remains unintelligible. For example, as seen by reference to FIG. 3 (bottom half), Transmitting Cell 1 conveys data packet 4 to Receiving Cell 1; the other sets of Transmitting/Receiving Cells and data packets are similarly scrambled. The receiving device would then need to properly assemble the data packets to create usable data.

This physical encryption process may take place either immediately before, or concurrently with the start of data transmission.

For small arrays of transmitting and receiving cells, this encryption affords only a modest amount of additional protection, as it would be rather easy to "brute force" through a decryption of the signal to determine the intended signal. However, as the number of transmitting and receiving cells grows, the strength of encryption scales exponentially with the size and speed of the transmission. For example, when five Transmitter/Receiver combinations are used, there are a total of 5!, or 120 possible ways to reassemble the data packets. When ten Transmitter/Receiver combination are used, there are a total of 10! (ten factorial), or 3,628,800 possible ways to reassemble the data. In one embodiment of this disclosure, as many Transmitter/Receiver pairing as possible, based on the technology available at the time, may be used, thus increasing security accordingly.

Figure 4:
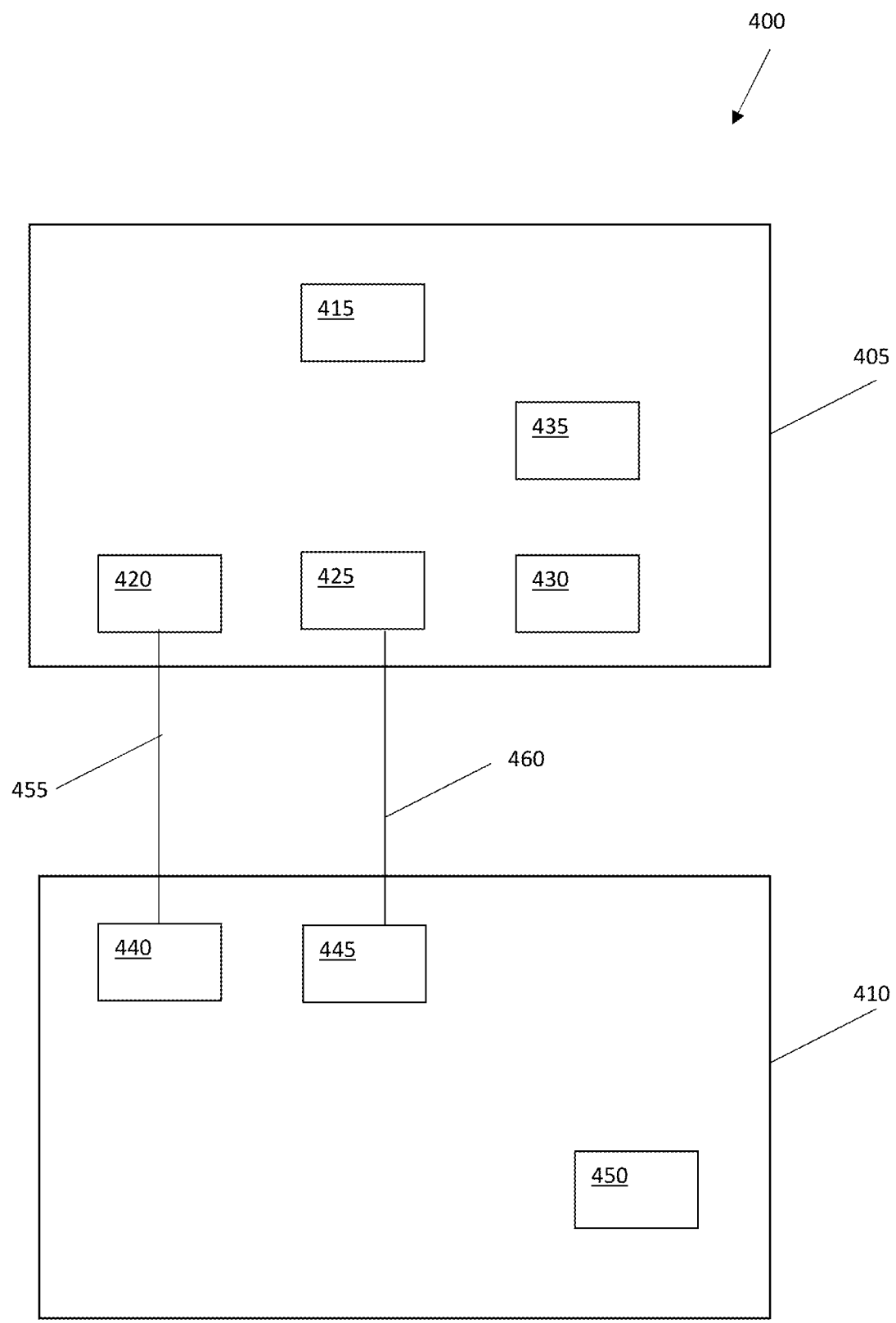
FIG. 4 is a block diagram of one embodiment of a laser light communication apparatus.

FIG. 4 is a block diagram of one embodiment of a laser light communication apparatus. As shown in FIG. 4, the laser light communication apparatus 400 may comprise a light transmitter 405, light receiver 410, control module 415, and a stabilizer 420. The light transmitter 405 may comprise one or more light transmitter cells 425 and a barrier light source 430, and the light receiver 410 may comprise one or more light receiving cells 440 and a barrier light receiver 445.

The control module 415 may convert data into an electronic signal that may be sent to the light transmitter 405 such that a series of light signals or pulses may be generated by the light transmitter cells 425 and received by corresponding light receiving cells 440. The series of light signals or pulses may be referred to herein as data light 455. Once the data light 455 is received by the corresponding light receiving cells 440, the control module 415 may decode and/or interpret the data light 455 to reconstruct the data. The light transmitter 405 may comprise a transmitter power source 435.

In one embodiment, there may be a plurality of light transmitting cells 425 and corresponding light receiving cells 440. The greater the number of light transmitting cells 425 and corresponding light receiving cells 440, the faster the data may be transmitted, up to a limit of physical limitations and available technology.

The barrier light source 430 may generate a barrier light 460 that substantially surrounds the data light 455, and the barrier light 460 may be received by the barrier light receiver 445. If the barrier light 460 is physically impeded, such as by an attempt to intercept the data transmission or an unexpected transmission interference, the barrier light receiver 445 may generate a stop signal that causes the light transmitter to cease transmitting the data light 455 until such time that the physical impedance is removed, at which point the barrier light receiver 445 may generate a go signal to cause the light transmitter to resume transmitting the data light 455 from a point immediately prior to the physical impedance incident. In one embodiment, the stop and go signals may be based on a light signal generated by the light receiver 410 and sent to the light transmitter 405. In an alternate embodiment the stop and go signals may be based on a wireless communication method.

In one embodiment the barrier light receiver 445 may charge a receiver power source 450 by using energy received from the barrier light 460. In an alternate embodiment, the light receiver 410 may charge a receiver power source by using energy received from the data light 455. One advantage of these embodiments is that only the light transmitter 405 may need to have its own power source that is charged by standard mechanisms, whereas the light receiver 410 may be not independently powered, thereby allowing for data transmission to a location where maintaining a steady power supply may be difficult, such as a remote location in space.

In an alternate embodiment, the light transmitter and receiver may both be transceivers comprising both light transmitters and light transceivers. In one embodiment, the transmitters and receivers may be arranged in an alternating mating pattern, such that data may be transferred in either direction, either simultaneously or sequentially.

Figure 5:
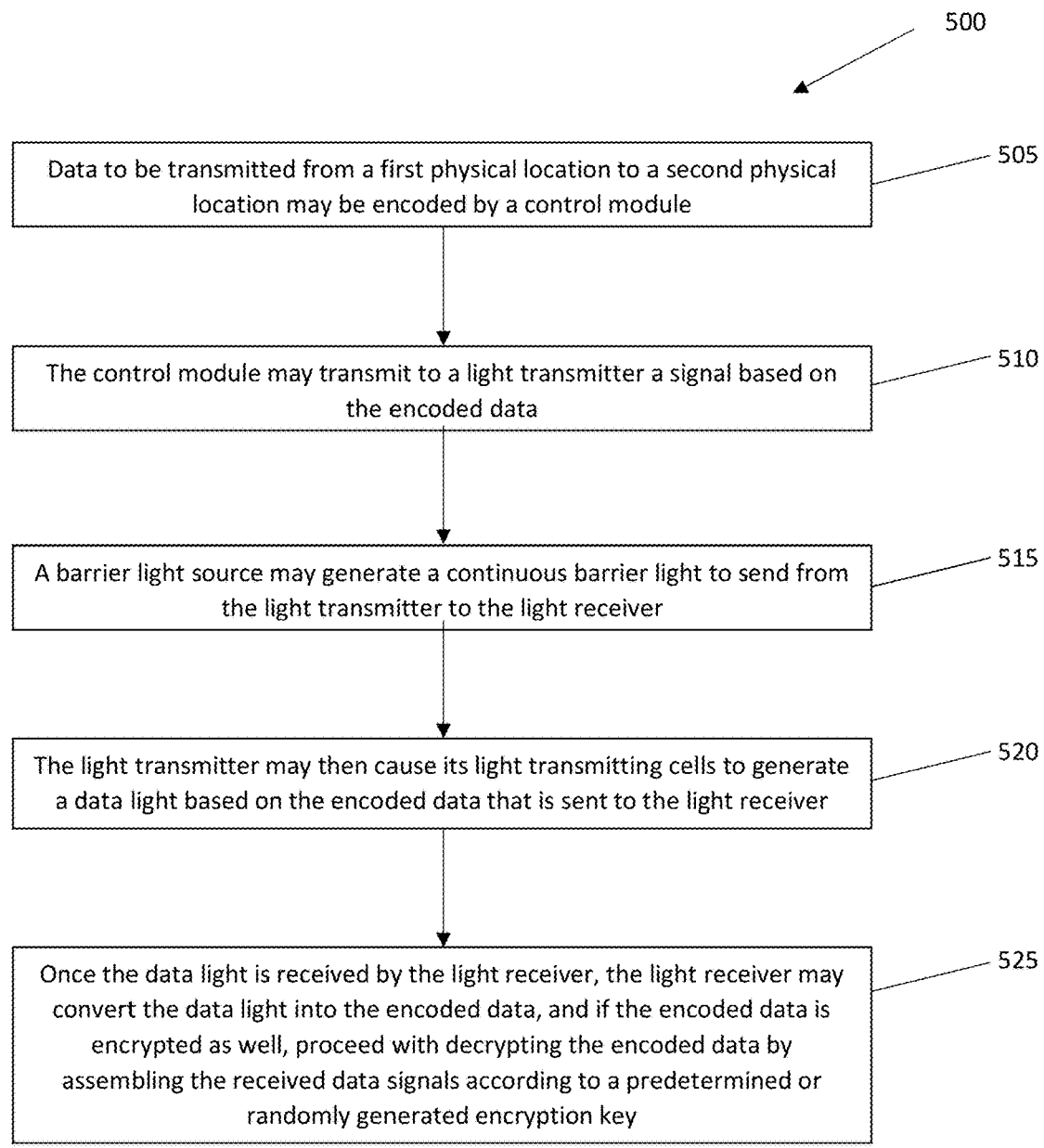
FIG. 5 is a flow diagram of one embodiment of a method of transmitting information using a laser light communication apparatus.

FIG. 5 is a flow diagram of one embodiment of a method of transmitting information using a laser light communication apparatus 500. The method described herein utilizes a laser light communication apparatus as disclosed hereinabove.

First, data to be transmitted from a first physical location to a second physical location may be encoded by a control module 505. Then, the control module may transmit to a light transmitter a signal based on the encoded data 510. In order to ensure integrity of the data transmission, a barrier light source may generate a continuous barrier light to send from the light transmitter to the light receiver 515. The light transmitter may then cause its light transmitting cells to generate a data light based on the encoded data that is sent to the light receiver 520. Once the data light is received by the light receiver, the light receiver may convert the data light into the encoded data, and if the encoded data is encrypted as well, proceed with decrypting the encoded data by assembling the received data signals according to a predetermined or randomly generated encryption key 525.

How the data is encoded may be dependent upon several considerations. One consideration is how many light transmitting cells the light transmitter to be used has. In order to most efficiently effect transfer, the control module may encode the data such that each light transmitting cells is active the same amount of time, and active in parallel. For example, if the light transmitter comprises an 8×8 grid of light transmitting cells, the light transmitter may encode the data such that each of the 64 light transmitting cells has a portion of the data to send, by breaking the data down into 64 different data packets. One advantage of this type of encoding is that while the data is being encoded, it may simultaneously be physically encrypted by assigning the data packets to a particular light transmitting cell. This assignment, or encryption, may be predetermined or randomly generated. When predetermined, the predetermined order may also be known by a corresponding light receiver for decryption, such that as the data is transmitted, the light receiver may compile the various data packets according to the predetermined encryption assignment. When a randomly generated encryption assignment is used, the light transmitter may generate an encryption light to send to the light receiver prior to transmitting the data.

The barrier light may serve the purpose of ensuring that the data transmission is not interrupted, or if it is, allowing the laser light communication apparatus to identify which portions of the data need to be re-sent, or potentially begin the entire transmission process again for security purposes.

Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The processes or methods depicted in the figures may be performed by processing logic that comprises hardware (e.g. circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

While the present disclosure has been described in terms of particular variations and illustrative figures, those of ordinary skill in the art will recognize that the disclosure is not limited to the variations or figures described. In addition, where methods and steps described above indicate certain events occurring in certain order, those of ordinary skill in the art will recognize that the ordering of certain steps may be modified and that such modifications are in accordance with the variations of the devices and methods of this disclosure. Additionally, certain of the steps may be performed concurrently in a parallel process when possible, as well as performed sequentially as described above. To the extent there are variations of the devices and methods of this disclosure, which are within the spirit of the disclosure or equivalent to the embodiments found in the claims, it is the intent that this patent will cover those variations as well. Therefore, the present disclosure is to be understood as not limited by the specific embodiments described herein, but only by scope of the appended claims.

What is claimed is:

1. A laser light communication apparatus, comprising:
a light transmitter;
a light receiver; and
a control module;
wherein said light transmitter comprises one or more light transmitting cells; wherein said light receiver comprises one or more light receiving cells;
wherein said light transmitting cells are configured to generate a data light, wherein said data light is based on a data packet to be transmitted;
wherein said light transmitter comprises a barrier light source;
wherein said barrier light source is configured to physically surround said one or more light transmitting cells such that said barrier light source is configured to generate a light barrier that encapsulates said data light; and
wherein said barrier light source is configured to safeguard said data light from physical interceptions;
wherein said light receiver comprises a barrier light receiver;
wherein said barrier light receiver is in electronic communication with said control module and is configured to generate a stop signal if said barrier light receiver does not receive said light generated by said barrier light source; and
wherein said stop signal causes said light transmitter to pause generating said data light.

2. The laser light communication apparatus of claim 1, wherein said barrier light source comprises a plurality of light emitting sources.

3. The laser light communication apparatus of claim 1, wherein said barrier light receiver is configured to generate a go signal if said barrier light receiver receives said light generated by said barrier light source after generating said stop signal; and
wherein said control module is configured to determine a portion of said data packet to be transferred that was interrupted between said stop and go signals and resend said portion of said data packet to be transferred and thereafter continue transmitting remainder of said data packet to be transferred.

4. The laser light communication apparatus of claim 3, wherein said light receiver comprises a power source that is charged when said barrier light receiver receives said light generated by said barrier light source.

5. The laser light communication apparatus of claim 1, wherein said light receiver comprises a power source that is charged when said light receiver receives said data light.

6. The laser light communication apparatus of claim 1, further comprising a stabilizer;
wherein said stabilizer ensures that said light transmitter and said light receiver are aligned such that said data light is received by said light receiving cells.

7. A laser light communication apparatus, comprising: a light transmitter;
a light receiver;
a stabilizer; and
a control module;
wherein said light transmitter comprises one or more light transmitting cells;
wherein said light receiver comprises one or more light receiving cells; and
wherein said light transmitting cells are configured to generate a data light, wherein said data light is based on a data packet to be transmitted;

wherein said light transmitter comprises a barrier light source;
  wherein said barrier light source is configured to physically surround said one or more light transmitting cells such that said barrier light source is configured to generate a light barrier that encapsulates said data light;
  wherein said barrier light source comprises a plurality of light emitting sources;
  wherein said light receiver comprises a barrier light receiver;
  wherein said barrier light receiver is in electronic communication with said control module and is configured to generate a stop signal if said barrier light receiver does not receive said light generated by said barrier light source;
  wherein said stop signal causes said light transmitter to pause generating light;
  wherein said barrier light receiver is configured to generate a go signal if said barrier light receiver receives said light generated by said barrier light source;
  wherein said control module is configured to determine a portion of said data packet to be transferred that was interrupted between said stop and go signals and resend said portion of said data packet to be transferred and thereafter continue transmitting remainder of said data packet to be transferred; and
  wherein said stabilizer ensures that said light transmitter and said light receiver are aligned such that said data light is received by said light receiver.

8. The laser light communication apparatus of claim 7, wherein said light receiver comprises a power source that is charged when said light receiver receives said data light.

9. The laser light communication apparatus of claim 7, wherein said light receiver comprises a power source that is charged when said barrier light receiver receives said light generated by said barrier light source.

10. A method of transmitting information using a laser light communication apparatus, comprising the step of transmitting a data from a data transmitter to a data receiver;
  wherein said data transmitter is a light transmitter comprising one or more light transmitting cells;
  wherein said light transmitting cells are configured to generate a data light,
  wherein said data light is based on a data packet to be transmitted;
  wherein said light transmitter comprises a barrier light source;
    wherein said barrier light source is configured to physically surround said one or more light transmitting cells such that said barrier light source is configured to generate a light barrier that encapsulates said data light;
  wherein said data receiver is a light receiver comprising one or more light receiving cells; and
  wherein said data is encoded by a control module to be translated into a series of light pulses;
  wherein said light receiver comprises a barrier light receiver;
  wherein said barrier light receiver is in electronic communication with said control module and is configured to generate a stop signal if said barrier light receiver does not receive said light generated by said barrier light source; and
  wherein said stop signal causes said light transmitter to pause generating said data light.

11. The method of transmitting information of claim 10, wherein said data is transmitted through said series of light pulses, which are generated by said light transmitting cells and received by said light receiving cells.

12. The method of transmitting information of claim 11, further comprising the step of physically encrypting said data by having said control module allocate portions of said data to specific individual units of said light transmitting cells via an encryption key, such that after said data is received by said light receiver, said data must be decrypted according to said encryption key in order to be intelligible.

13. The method of transmitting information of claim 12, wherein said encryption key is predetermined.

14. The method of transmitting information of claim 12, wherein said encryption key is generated and transmitted to said light receiver before any of said data is transmitted from said light transmitter to said light receiver.

* * * * *